United States Patent [19]
Diekwisch

[11] Patent Number: 5,820,724
[45] Date of Patent: *Oct. 13, 1998

[54] MEMBRANE PRESS, WORK BASE, AND FLUID-ACTUATED ELEVATING ASSEMBLY

[75] Inventor: Hartmut Diekwisch, Herford, Germany

[73] Assignee: Smartech L.L.C., Charlotte, N.C.

[*] Notice: The term of this patent shall not extend beyond the expiration date of Pat. No. 5,820,724.

[21] Appl. No.: 700,303

[22] Filed: Aug. 20, 1996

Related U.S. Application Data

[63] Continuation-in-part of Ser. No. 448,068, May 23, 1995, Pat. No. 5,580,415, which is a continuation-in-part of Ser. No. 229,976, Apr. 19, 1994, Pat. No. 5,522,478.

[51] Int. Cl.$^6$ .............................. B29C 51/00; B30B 5/02
[52] U.S. Cl. .................. 156/382; 156/475; 156/583.3; 100/211; 100/299; 269/20; 269/21; 269/58
[58] Field of Search ..................................... 156/285, 286, 156/382, 475, 580, 583.1, 583.3; 100/211, 299; 269/20, 21, 58

[56] References Cited

U.S. PATENT DOCUMENTS

| | | | |
|---|---|---|---|
| 4,314,814 | 2/1982 | Derode | 156/583.3 |
| 4,447,282 | 5/1984 | Valerio et al. | 156/583.3 |
| 5,225,027 | 7/1993 | Diekwisch | 156/382 |
| 5,346,193 | 9/1994 | Kitagawa | 269/21 |
| 5,397,214 | 3/1995 | Cheung | 187/274 |
| 5,522,478 | 6/1996 | Diekwisch | 187/273 |
| 5,580,415 | 12/1996 | Diekwisch | 156/382 |

FOREIGN PATENT DOCUMENTS 139 147   5/1990   Japan .

OTHER PUBLICATIONS

Prof. Rolf Hesch, "Membrane Press Systems A Critical Comparison with View to Heating Systems, Heat Distribution, Pressing Time and Costs," all pages.
Heinrich Wemhöner, "The Development of Membrane Press Technology," all pages.
FDM's Woodworking Technology 2000, "Unbeatable Doors at Any Price," Oct. 1993, all pages.

*Primary Examiner*—James Sells
*Attorney, Agent, or Firm*—Adams Law Firm, P.A.

[57] ABSTRACT

A membrane press is provided for applying a laminating foil to a three-dimensional workpiece to be laminated. The membrane press includes a work base having a supporting surface for carrying the workpiece, and a frame located above the workpiece for holding the foil. The improvement in the membrane press includes a pedestal housing located in the work base and having a cylinder therein communicating through a pedestal opening with the supporting surface of the work base. A piston rod including a workpiece elevating and lowering pedestal is positioned in the cylinder in axial alignment therewith. The pedestal communicates with the supporting surface through the pedestal opening. Upper and lower pistons are affixed to the piston rod in fluid-pressure transmitting relation within the cylinder in axially spaced-part relation to each other. The pistons define respective upper and lower axially aligned pressure-transmitting surfaces. Fluid pressure selectively communicates with the cylinder and the pressure-transmitting surfaces of the pistons for moving the pistons and the pedestal between a workpiece-elevating position wherein one end of the pedestal extends through the pedestal opening to elevate the workpiece above the supporting surface of the work base, and a workpiece-loading position wherein the pedestal is retracted to a position below the workpiece supporting surface of the work base.

23 Claims, 9 Drawing Sheets

MEMBRANE PRESS, WORK BASE, AND FLUID-ACTUATED ELEVATING ASSEMBLY

This application is a continuation-in-part of U.S. patent application Ser. No. 08/448,068, May 23, 1995, now U.S. Pat. No. 5,580,415 which is a continuation-in-part of U.S. patent application Ser. No. 08/229,976, Apr. 19, 1994, now U.S. Pat. No. 5,522,478.

TECHNICAL FIELD AND BACKGROUND OF THE INVENTION

This invention relates to a membrane press, work base, and fluid-actuated elevating assembly for elevating a three-dimensional workpiece carried by the work base. Membrane presses have been in existence since the early 1900's, and are used for applying a uniform, laminating exterior veneer to the top surface, corners, and peripheral borders of a relatively thin and flat, three-dimensional workpiece. The resulting laminated workpieces are typically used in furniture fronts, doors, cabinetry, desks, and other similar items where pleasing outward appearance and durability is desirable.

The pressing cycle of the present-day membrane press, using combined contact and convection heating, takes place in essentially four stages. The membrane press is first opened, and the laminating foil clamped along its respective edges to a tensioning frame positioned directly above the workpiece to be laminated. The tensioning frame includes a top heating platen and membrane located adjacent to and above the laminating foil. The membrane is sucked upwardly by a vacuum source to the top heating platen which acts to heat the membrane.

In a second stage, the membrane press is closed over the workpiece, and the membrane ventilated through exhaust passages. Hot air is circulated between the top heating platen and membrane to further heat the membrane. The foil is sucked upwardly into contact with the heated membrane by a second vacuum source to change the foil to its plastic state.

Thirdly, a third vacuum source is established under the heated foil to prevent air pockets from forming between the foil and exterior surface of the workpiece. The hot air circulated between the top heating platen and membrane is replaced by pressurized heated air to force the membrane and laminating foil downwardly onto the surface of the workpiece.

Finally, separation air is injected between the foil and membrane to lift and separate the membrane from the foil. After pressing, any excess foil overlapping the peripheral borders and corners of the laminated workpiece is removed by cutting. An additional surface finish or coating may then be applied to the workpiece to create a finished product ready for use in a furniture front, or similar article.

In order to properly and uniformly apply the laminating foil to the peripheral borders and corners of the workpiece, as described above, the workpiece must be slightly elevated above the supporting surface of the press table. According to prior art presses, a relatively thin particle board, often referred to as a dummy board, piggyback board, or raiser panel, is placed under the workpiece. These dummy boards limit the production of the press, since the corners of the boards often crumble during pressing. The crumbled particles then become positioned under the foil, which ultimately results in workpiece rejects as the particles show through the foil. Moreover, the dummy boards must be shaped and sized to fit the dimensions of each particular workpiece.

The present invention provides an alternative means for elevating the workpiece above the supporting surface of a work press, such as a membrane press. The present invention utilizes a fluid force acting beneath the workpiece and foil to elevate the workpiece. This results in increased production of the press, and reduces the number of workpiece rejects.

In addition, the invention in not limited to membrane presses, but instead has application to any work base where elevating a workpiece for processing is desirable. For example, the invention may be applicable to CNC routers, thermal-forming presses, deep-draw machines (vacuum presses), or any machine combining surface and edge processing in a single step.

SUMMARY OF THE INVENTION

Therefore, it is an object of the invention to provide a membrane press and work base which eliminates a need for dummy boards to elevate the workpiece above the supporting surface of the press table during pressing.

It is another object of the invention to provide a membrane press and work base including means operable for elevating any given custom-sized, three-dimensional workpiece.

It is another object of the invention to provide a membrane press having increased production capability.

It is another object of the invention to provide a membrane press and work base which produces a reduced number of workpiece rejects.

It is another object of the invention to provide a membrane press and work base which includes a workpiece elevating assembly which utilizes two pistons in tandem to increase the surface area for fluid-induced movement of the pedestal.

It is another object of the invention to provide a membrane press which utilizes a concentrated fluid source to elevate the workpiece during pressing.

It is another object of the invention to provide a fluid-actuated elevating assembly for being incorporated into any work base not limited to membrane presses.

These and other objects of the present invention are achieved in the preferred embodiments disclosed below by providing a membrane press for applying a laminating foil to a three-dimensional workpiece to be laminated. The membrane press includes a work base having a supporting surface for carrying the workpiece, and a frame located above the workpiece for holding the foil. The improvement in the membrane press includes a pedestal housing located in the work base and having a cylinder therein communicating through a pedestal opening with the supporting surface of the work base. A piston rod including a workpiece elevating and lowering pedestal is positioned in the cylinder in axial alignment therewith. The pedestal communicates with the supporting surface through the pedestal opening.

Upper and lower pistons are affixed to the piston rod in fluid-pressure transmitting relation within the cylinder in axially spaced-part relation to each other. The pistons define respective upper and lower axially aligned pressure-transmitting surfaces. The axial alignment of the pressure-transmitting surfaces permits substantially increased fluid pressure-responsive surface area within the cylinder. Fluid pressure means selectively communicates with the cylinder and the pressure-transmitting surfaces of the pistons for moving the pistons and the pedestal between a workpiece-elevating position wherein one end of the pedestal extends through the pedestal opening to elevate the workpiece above the supporting surface of the work base, and a workpiece-loading position wherein the pedestal is retracted to a position below the workpiece supporting surface of the work base.

According to one preferred embodiment of the invention, the cylinder of the pedestal housing includes upper and lower divided cylinder portions for housing respective upper and lower pistons.

According to another preferred embodiment of the invention, the diameter of the upper piston is slightly smaller than the diameter of the upper cylinder portion.

According to yet another preferred embodiment of the invention, a fluid sealing ring is located around the circumference of the upper piston for restricting the flow of fluid through an annular space between the upper cylinder portion and the upper piston.

According to yet another preferred embodiment of the invention, the upper cylinder portion has a bottom with a centrally disposed circular opening therein having a diameter slightly larger than the diameter of the piston rod. The piston rod extends through the bottom opening from the upper cylinder portion to the lower cylinder portion.

According to yet another preferred embodiment of the invention, a fluid sealing ring is located at the bottom opening formed in the upper cylinder portion for restricting the flow of fluid into the upper cylinder portion through an annular space between the piston rod and the bottom opening.

According to yet another preferred embodiment of the invention, the diameter of the lower piston is slightly smaller than the diameter of the lower cylinder portion.

According to yet another preferred embodiment of the invention, a fluid sealing ring is located around the circumference of the lower piston for restricting the flow of fluid through an annular space between the lower cylinder portion and the lower piston.

According to yet another preferred embodiment of the invention, a fluid exhaust path is fluidly connected to the cylinder for exhausting fluid contained in the cylinder as the pistons and the pedestal move between the workpiece-loading position and the workpiece-elevating position.

According to yet another preferred embodiment of the invention, the piston rod includes a hollow section located between the upper and lower pistons and having a longitudinal flow path therethrough from an entrance opening located at a lower end of the hollow section adjacent to a bottom side of the lower piston to an exit opening located at an upper end of the hollow section adjacent to a bottom side of the upper piston.

According to yet another preferred embodiment of the invention, the lower end of the hollow section extends outwardly from the bottom side of the lower piston, and selectively communicates with a source of positive air flow for elevating the pistons and the pedestal to the workpiece-elevating position.

BRIEF DESCRIPTION OF THE DRAWINGS

Some of the objects of the invention have been set forth above. Other objects and advantages of the invention will appear as the description proceeds when taken in conjunction with the following drawings, in which.

DESCRIPTION OF THE PREFERRED EMBODIMENT AND BEST MODE

Figure 1:
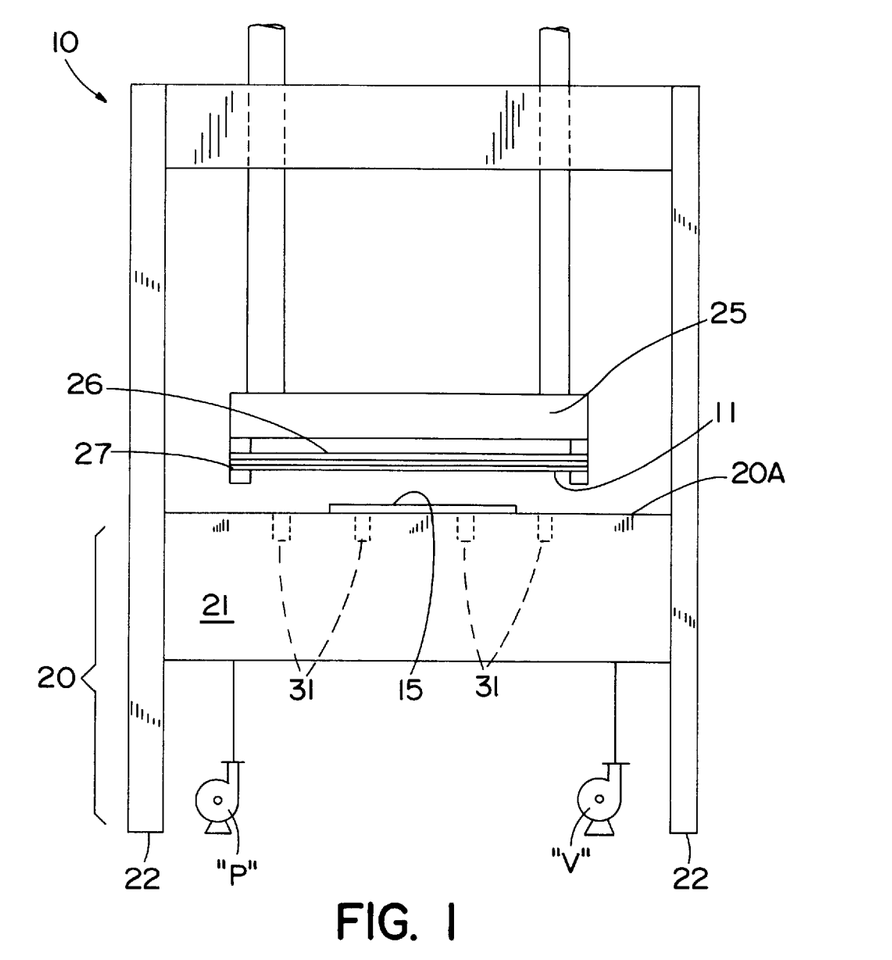
FIG. 1 is an end elevational view of a membrane press according to one preferred embodiment of the invention, and showing a workpiece loaded onto the supporting surface of the work base prior to lamination.

Referring now specifically to the drawings, a membrane press according to the present invention is illustrated in FIG. 1 and shown generally at reference numeral 10. The membrane press 10 is used for applying a laminating foil 11 made from a thermoplastic material, such as polyolefin, to the exterior surface of a workpiece 15 to be laminated. In the embodiment disclosed, the workpiece 15 is a wood-based, profiled MFD board. Such boards are typically used as furniture fronts for cabinetry, countertops, kitchen tables, and the like.

Figure 2:
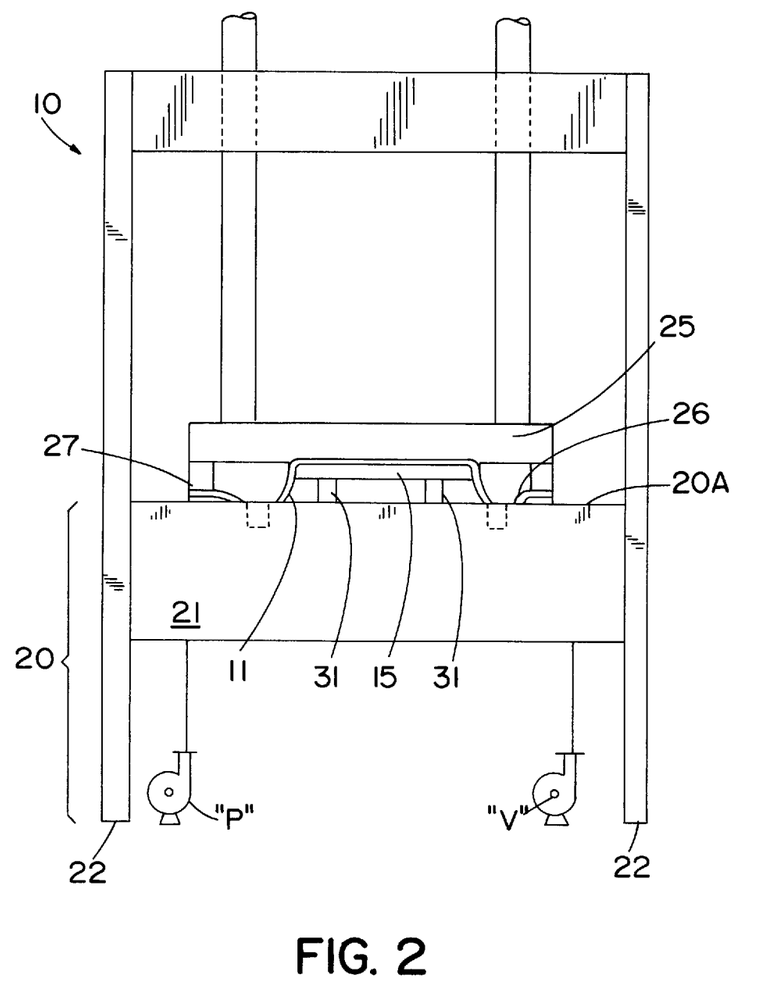
FIG. 2 is an end elevational view of the membrane press, and showing the workpiece in an elevated position above the supporting surface of the work base during lamination.

As shown in FIGS. 1 and 2, the membrane press 10 includes a work base 20 for supporting the workpiece 15 to be laminated. The work base 20 is constructed generally of a bottom press table 21 supported by legs 22, and preferably includes a bottom heating platen.

A top heating platen 25, membrane 26, and foil-pressing frame 27 are positioned above the workpiece 15 for heating the laminating foil 11, and applying the laminating foil 11 to the workpiece 15, as shown in FIG. 2. The membrane press 10 may utilize any desired foil-pressing frame 27 known in the art, such as a Vario-frame or multi-purpose frame. In addition, the membrane press 10 is not limited to a particular class of presses. For example, the membrane press 10 may be one which is preferably operated without a membrane 26, or one which is preferably operated with a membrane 26, or one which must include a membrane 26.

According to one technique, membrane pressing occurs by first clamping the edges of the laminating foil 11 into the foil-pressing frame 27 in a tensioned condition, lowering the foil-pressing frame 27 onto the supporting surface 20A of the work base 20, then heating the foil 11 by operation of the top heating platen 25 and membrane 26 to apply the foil 11 to the workpiece 15. A downward pressure of approximately 4 bar acts on the membrane 26 during lamination.

To enable complete and uniform application of the foil 11 to the workpiece 15 including the peripheral borders and corners of the workpiece 15, the workpiece 15 must be slightly elevated above the supporting surface 20A of the work base 20. As previously described, one prior art means of elevating the workpiece 15 includes the use of a dummy board. The present membrane press 10 eliminates the need for such boards by providing a fluid-actuated elevating assembly for elevating the workpiece 15 above the supporting surface 20A of the work base 20 for lamination. The fluid used is preferably air, although other fluids such as a gas or water may be employed. The elevating assembly is described in detail below.

Fluid-Actuated Elevating Assembly

The work base 20 of the membrane press 10 includes a number of spaced-apart, like pedestals 31 which cooperate, as described below, to lift the workpiece 15 upwardly from the workpiece-loading position, shown in FIG. 1, to the workpiece-lifting position, shown in FIG. 2. Lamination of the workpiece 15 takes place with those pedestals 31 covered by the workpiece 15 in the workpiece-lifting position, thereby elevating the workpiece 15 above the supporting surface 20A. This allows uniform coverage of the peripheral borders and corners of the workpiece 15 with the laminating foil 11. The pedestals 31 are preferably spaced in rows and columns at about 50 mm intervals. Thus, four pedestals 31 are utilized for lifting a 65×65 mm workpiece. See FIG. 3.

Figure 3:
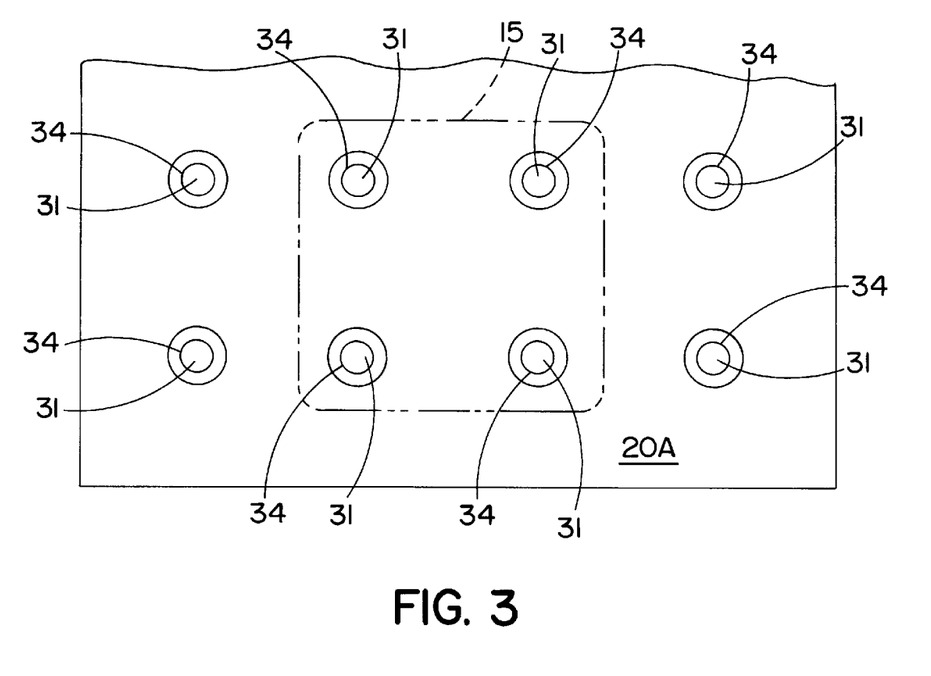
FIG. 3 is a fragmentary top plan view of the supporting surface of the work base with the workpiece shown in phantom.
Figure 5:
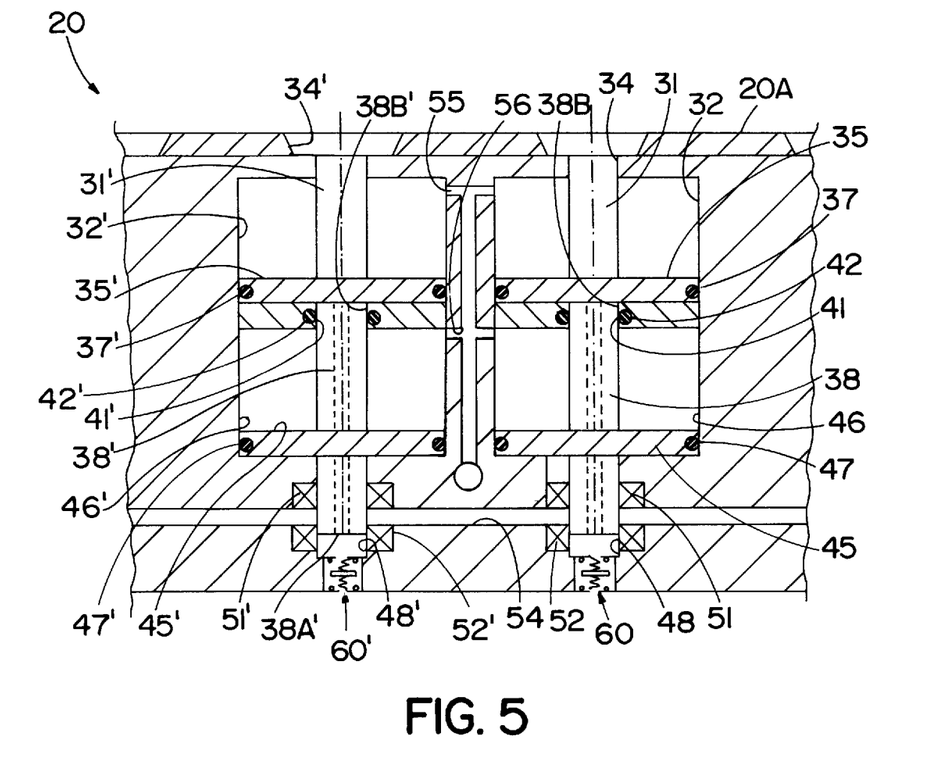
FIG. 5 is a cross-sectional view of an interior portion of the work base showing a pair of pedestal elevating assemblies with respective pedestals in a workpiece-loading position prior to loading the workpiece onto the surface of the work base.

Referring to FIGS. 3 and 5, each pedestal 31 is housed in an upper cylinder 32 located adjacent to the surface 20A of the work base 20, and defining a pedestal opening 34 of reduced diameter through which the pedestal 31 moves when actuated. A lower end of the pedestal 31 is connected to an upper piston 35 having a diameter slightly smaller than the diameter of the cylinder 32, and a rubber seal ring 37 located around its circumference to restrict air flow through the annular space between the piston 35 and cylinder wall. Any friction created by engagement of the seal ring 37 and cylinder wall does not impede sliding movement of the piston 35 within the cylinder 32. According to one embodiment, the diameter of the cylinder 32 is about 43 mm and the diameter of the piston 35 about 42.5 mm.

A rigid, hollow air transfer tube 38 is connected to the bottom side of the upper piston 35 in axial alignment with the pedestal 31, and extends through a circular opening 41 formed in the bottom wall of the cylinder 32. The opening 41 is slightly larger than the diameter of the tube 38, and preferably includes a rubber seal ring 42 around its circumference to restrict air flow through the annular space between the opening 41 and the tube 38. The seal ring 42 does not impede sliding movement of the tube 38 during actuation of the pedestal 31. The hollow center of the tube 38 defines a flow path extending from an entrance opening 38A located its bottom end to an exit opening 38B adjacent to the bottom side of the upper piston 35. According to one embodiment, the diameter of the opening through the tube 38 is about 2–3 mm.

A lower piston 45 is connected to the air transfer tube 38, and is housed within a lower cylinder 46 adjacent to the bottom wall of the upper cylinder 32 and concentric with the opening 41. The lower piston 45 has a diameter slightly smaller than the diameter of the lower cylinder 46, and a rubber seal ring 47 located around its circumference to restrict air flow through the annular space between the lower piston 45 and cylinder wall. Any friction created by engagement of the seal ring 47 and the cylinder wall does not impede sliding movement of the lower piston 45 within the lower cylinder 46. According to one embodiment, the diameter of the lower cylinder 46 is about 43 mm and the diameter of the lower piston 45 about 42.5 mm.

Figure 6:
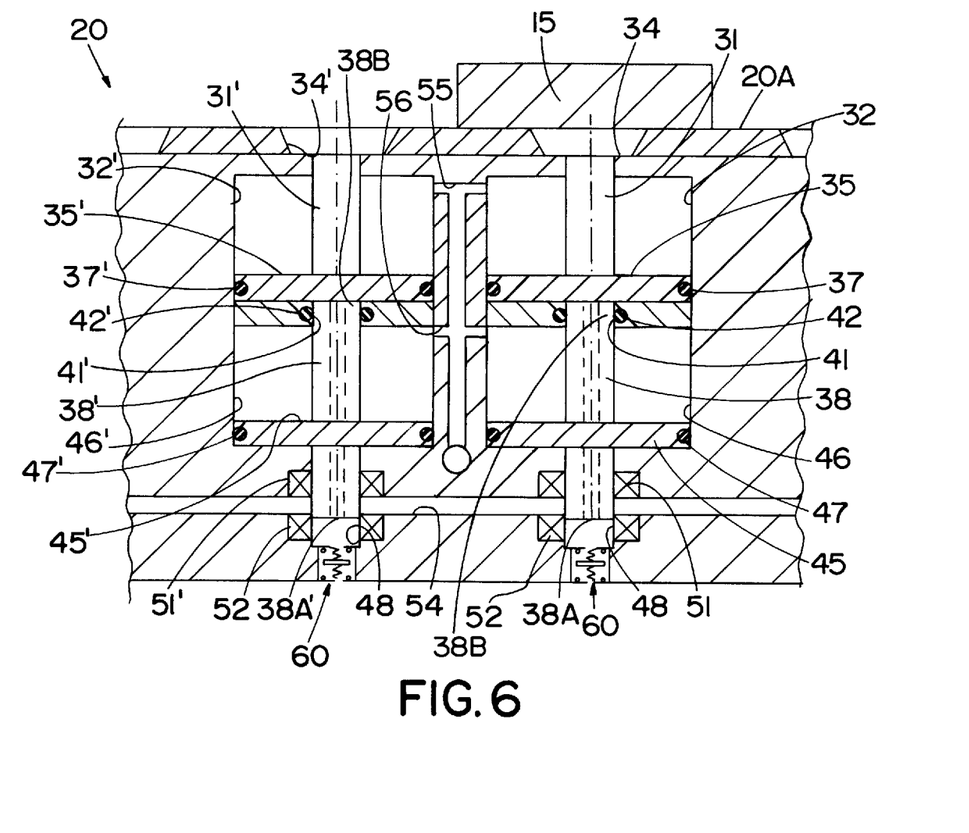
FIG. 6 is a cross-sectional view of an interior portion of the work base with the workpiece loaded onto the surface of the work base to cover one of the pedestal openings.

The air transfer tube 38 extends through the center of the lower piston 45, and into a chamber 48 formed beneath the lower cylinder 46. Spaced-apart rubber seal rings 51 and 52 cooperate to seal air flow into the chamber with the pedestal 31 positioned as shown in FIGS. 5 and 6.

Figure 4A:
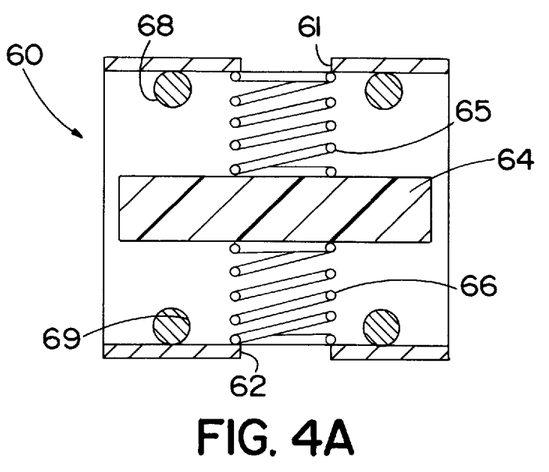
FIG. 4A is a cross-sectional view of an interior portion of the work base, and showing an enlargement of the valve assembly illustrated generally in FIGS. 5–9 when in the open position.
Figure 4B:
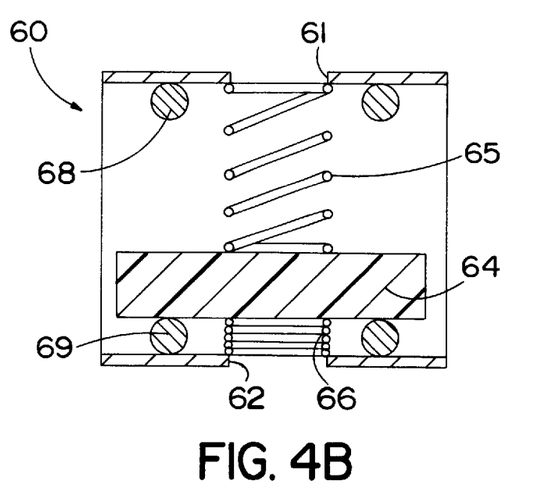
FIG. 4B is a cross-sectional view of an interior portion of the work base, and showing an enlargement of the valve assembly illustrated generally in FIGS. 5–9 when in the closed position.

As best shown in FIGS. 4A and 4B, a valve assembly 60 is located in a void beneath the chamber 48 and serves to regulate air pressure within the chamber 48 during movement of the pedestal 31. The valve assembly 60 fluidly communicates with the chamber 48 and with the atmosphere through openings 61 and 62, respectively, and includes a plunger 64 biased between opposing springs 65 and 66 and in axial alignment with the openings 61 and 62. Spaced-apart, rubber O-rings 68 and 69 are located on opposite sides of the plunger 64 to provide respective seals against high-pressure air flow into and out of the chamber 48.

Under light pressure conditions, the plunger 64 is generally centered between the O-lings 68 and 69, as shown in FIG. 4A, to allow air flow around the plunger and through the openings 61 and 62. A sudden build-up of pressure within the chamber 48 causes the plunger 64 to move downwardly against the force of the spring 66, and to seat itself on the lower O-ring 69 thereby sealing off air flow out of the chamber 48, as shown in FIG. 4B. When this pressure is released, the spring 66 urges the plunger 64 back into its normal position between the O-rings 68 and 69. A light pressure condition is defined generally as being less than about 1.5 bar.

According to the embodiment shown, during elevation of the pedestal 31, a positive flow of air is introduced into the chamber 48 through a flow path 54 connected to an air source "P". Separate flow paths 55 and 56 are likewise connected to the upper and lower cylinders 32 and 46, respectively, and communicate with a vacuum source "V" to draw air outwardly from the upper and lower cylinders 32 and 46.

Operation of the Elevating Assembly

Operation of the elevating assembly for a set of pedestals 31 and 31' is illustrated sequentially in FIGS. 5–9. Elements associated with the pedestal 31' are indicated in prime notation. FIG. 5 shows a portion of the work base 20 with the pedestals 31 and 31' in the workpiece-loading position prior to placing the workpiece 15 onto the supporting surface 20A. The vacuum source "V" and air source "P" are turned off, and the foil-pressing frame 27 situated a spaced-apart distance above the surface 20A, as shown in FIG. 1. Elevation of the workpiece 15 for lamination occurs in a series of steps.

Figure 7:
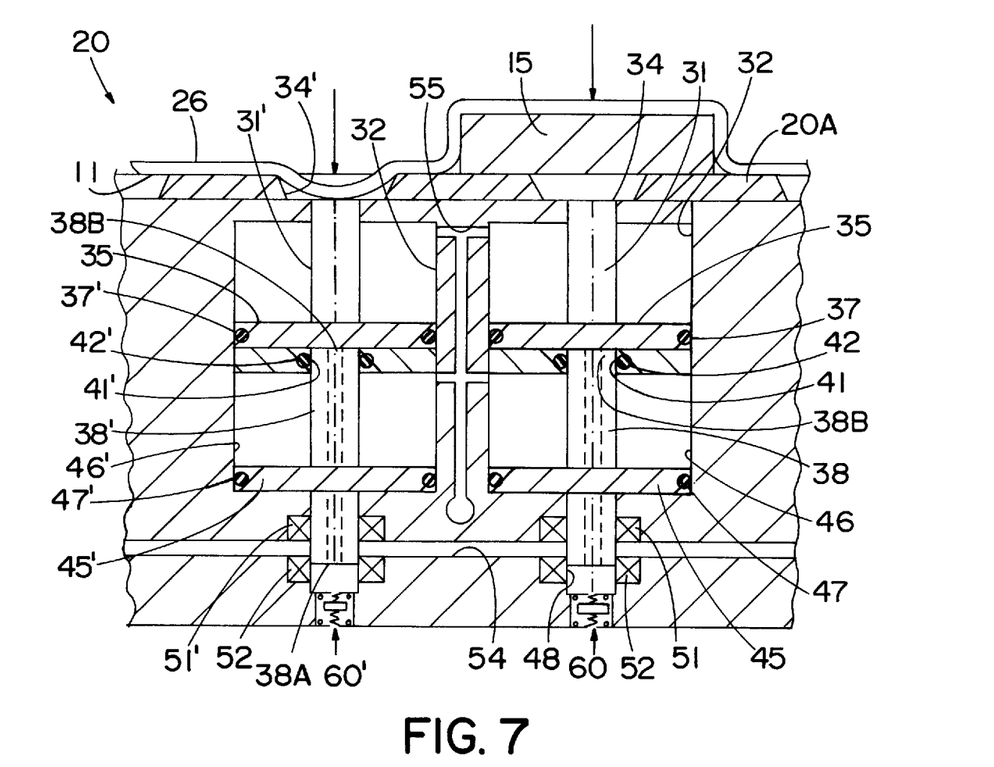
FIG. 7 is a cross-sectional view of an interior portion of the work base with foil-pressing frame lowered onto the work base to cover the workpiece with the laminating foil, and showing the location of the pedestal prior to activation of the vacuum source.

The first step is to load the workpiece 15 onto the surface 20A of the work base 20 to cover one or more of the pedestal openings 34, as shown in FIG. 6. The foil-pressing frame 27 (See FIGS. 1 and 2) is then lowered onto the work base 20 to position the foil 11 over the entire surface 20A, as shown in FIG. 7, covering the workpiece 15 and each of the exposed pedestal openings 34' not covered by the workpiece 15. The 4 bar pressure supplied by the membrane 26 forces the foil 11 onto the workpiece 15 and within the recesses defined by the exposed openings 34'.

Figure 8:
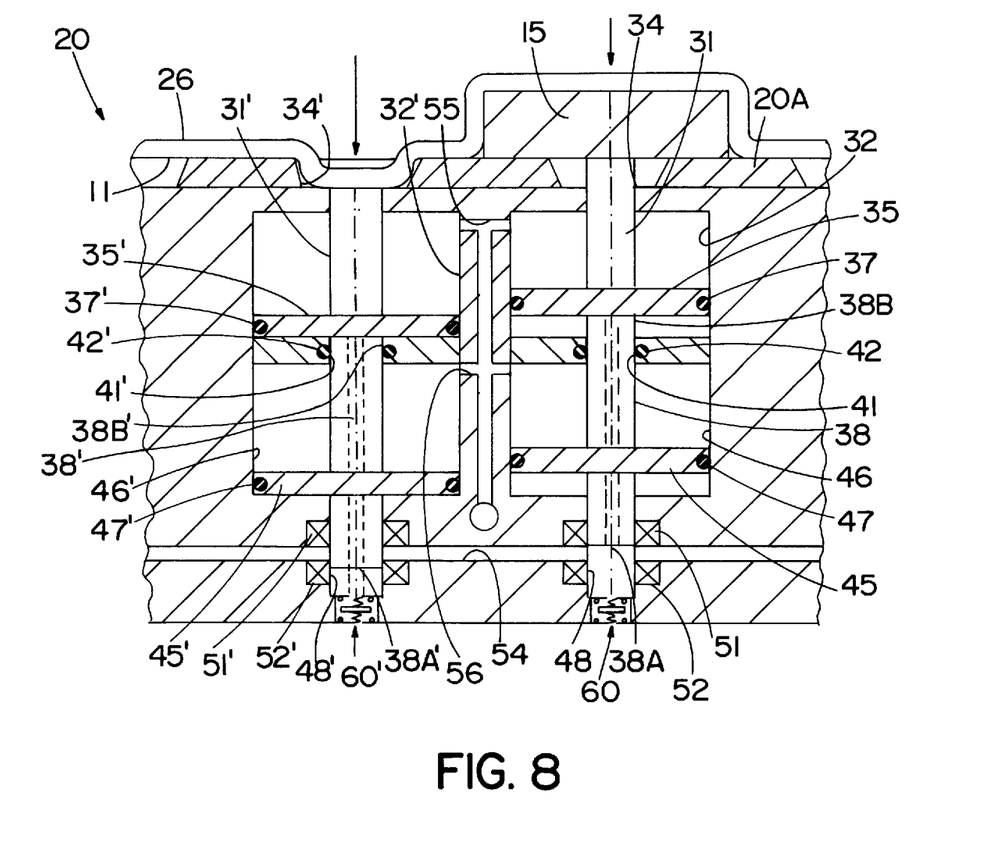
FIG. 8 is a cross-sectional view of an interior portion of the work base with the foil-pressing frame lowered onto the work base to cover the workpiece with the laminating foil, and showing the location of the pedestal immediately after activation of the vacuum source.

The next step is to activate the vacuum source "V" to generate about 0.6 bar suction force on a top side of the upper and lower pistons 35 and 45 through the air paths 55 and 56. This causes each of the covered pedestals 31, the attached upper and lower pistons 35 and 45, and the air transfer tube 38 to move in unison slightly upwardly to a point where the upper end of the pedestal 31 resides substantially even with the surface 20A at a bottom side of the workpiece 15, as shown in FIG. 8. As the pedestal 31 is pulled slightly upward by the suction force, air is drawn inwardly through the opening 62 and flows around the plunger 64 and through the opening 61 into the chamber 48. Under this light pressure condition, the plunger 64 remains substantially stationary in the position shown in FIG. 4A. Those pedestals 31' not covered by the workpiece 15 are forced downwardly by the 4 bar pressure supplied by the membrane 26 on the foil 11.

The next step is to activate the source "P" of positive air flow. As shown in FIG. 8, for each of the pedestals 31' not covered by the workpiece 15, air flow through the entrance opening 38A of the transfer tube 38 is blocked, thereby causing these pedestals 31' to remain in their lowered positions. For those pedestals 31 covered by the workpiece 15, the entrance opening 38A of the transfer tube 38 is fluidly connected to the air path 54, and approximately 7 bar of positive air flow is introduced upwardly through the transfer tube 38 and outwardly through the exit opening 38B to the bottom side of the upper piston 35 to initiate elevation of the pedestal 31.

Figure 9:
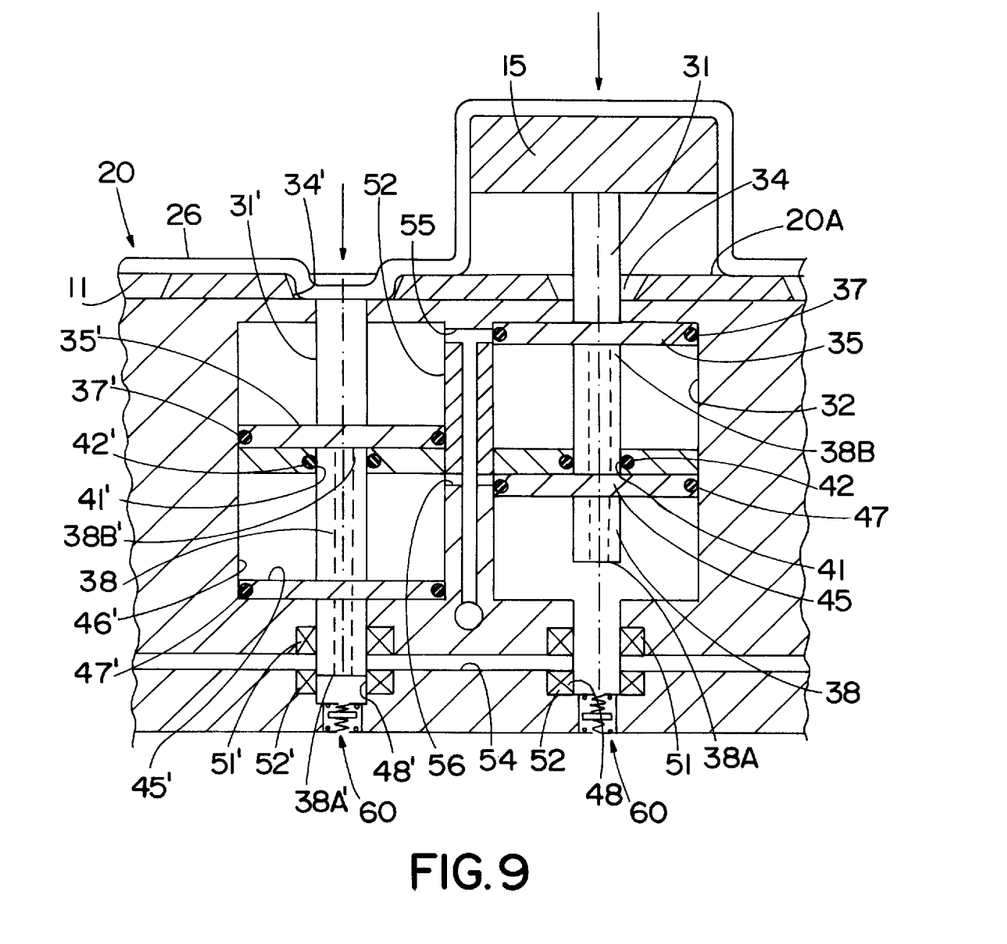
FIG. 9 is a cross-sectional view of an interior portion of the work base with the foil-pressing frame lowered onto the work base to cover the workpiece with the laminating foil, and showing the location of the pedestal in the workpiece-lifting position for workpiece lamination.

The sudden build-up of pressure in the chamber 48 is sufficient to urge the plunger 64 downwardly against the O-ring 69, as shown in FIG. 4B, in order to seal air loss through the opening 62. As the bottom end of the transfer tube 38 moves above the seal ring 51, the positive flow of air enters both the lower and upper cylinders 46 and 32, and acts on the bottom side of the lower piston 45 and the bottom side of the upper piston 35 to fully elevate the pedestal 31 and workpiece 15 carried by the pedestal, as shown in FIG. 9.

Respective bottom sides of the upper and lower pistons 35 and 45 thereby define pressure-transmitting surfaces which cooperate to provide substantially increased fluid-pressure-responsive surface area for lifting the pedestal 31. This increases the lift capacity of the pedestal 31 and furthers the overall efficiency of the elevating assembly. Any existing air within the cylinders 32 and 46 above the upper and lower pistons 35 and 45 is exhausted through the air paths 55 and 56, respectively, as the pistons 35 and 45 move upwardly in unison with the pedestal 31.

The pressure supplied by the air source "P" is sufficient to overcome the weight of the workpiece 15 and the downward force applied by the membrane 26. As the workpiece 15 elevates, the foil 11 held in tension by the frame 27 is uniformly applied to the peripheral borders and corners of the workpiece 15. After lamination, any excess foil 11 is properly trimmed from the workpiece 15, and the air source "P" and vacuum source "V" turned off causing the pedestals 31 covered by the workpiece 15 to return to their original positions within their respective cylinders 32. As the pistons 35 and 45 descend, air is exhausted through the opening 62 of the valve assembly 60 with the plunger 64 in the position shown in FIG. 4A. The laminated workpiece 15 is then collected for further processing.

A membrane press, work base, and fluid-actuated elevating assembly are described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

I claim:

1. A work base having a supporting surface for carrying a three-dimensional workpiece, comprising:

(a) a pedestal housing having a cylinder therein communicating through a pedestal opening with the supporting surface of the work base;

(b) a piston rod comprising a workpiece elevating and lowering pedestal positioned in said cylinder in axial alignment therewith and communicating with said supporting surface through said pedestal opening;

(c) upper and lower pistons affixed to said piston rod in fluid-pressure transmitting relation within said cylinder in axially spaced-part relation to each other and defining respective upper and lower axially aligned pressure-transmitting surfaces, said axial alignment of the pressure-transmitting surfaces permitting substantially increased fluid pressure-responsive surface area within the cylinder; and (d) fluid pressure means selectively communicating with said cylinder and said pressure-transmitting surfaces of said pistons for moving said pistons and said pedestal between:

(i) a workpiece elevating position wherein one end of said pedestal extends through said pedestal opening to elevate the workpiece above the supporting surface of the work base, and (ii) a workpiece loading position wherein the pedestal is retracted to a position below the workpiece supporting surface of the work base.

2. A work base according to claim 1, wherein the cylinder of said pedestal housing comprises upper and lower divided cylinder portions for housing respective upper and lower pistons.

3. A work base according to claim 2, wherein the diameter of the upper piston is slightly smaller than the diameter of the upper cylinder portion.

4. A work base according to claim 3, and comprising a fluid sealing ring located around the circumference of the upper piston for restricting the flow of fluid through an annular space between the upper cylinder portion and the upper piston.

5. A work base according to claim 2, wherein said upper cylinder portion has a bottom with a centrally disposed circular opening therein having a diameter slightly larger than the diameter of said piston rod, and wherein said piston rod extends through the bottom opening from the upper cylinder portion to the lower cylinder portion.

6. A work base according to claim 5, and comprising a fluid sealing ring located at the bottom opening formed in the upper cylinder portion for restricting the flow of fluid into the upper cylinder portion through an annular space between the piston rod and the bottom opening.

7. A work base according to claim 2, wherein the diameter of the lower piston is slightly smaller than the diameter of the lower cylinder portion.

8. A work base according to claim 7, and comprising a fluid sealing ring located around the circumference of the lower piston for restricting the flow of fluid through an annular space between the lower cylinder portion and the lower piston.

9. A work base according to claim 1, and comprising a fluid exhaust path fluidly connected to the cylinder for exhausting fluid contained in the cylinder as said pistons and said pedestal move between the workpiece-loading position and the workpiece-elevating position.

10. A work base according to claim 1, wherein said piston rod comprises a hollow section located between said upper and lower pistons and having a longitudinal flow path therethrough from an entrance opening located at a lower end of the hollow section adjacent to a bottom side of the lower piston to an exit opening located at an upper end of the hollow section adjacent to a bottom side of the upper piston.

11. A work base according to claim 10, wherein the lower end of the hollow section extends outwardly from the bottom side of said lower piston, and selectively communicates with a source of positive air flow for elevating said pistons and said pedestal to the workpiece-elevating position.

12. In a membrane press for applying a laminating foil to a three-dimensional workpiece to be laminated, the membrane press including a work base having a supporting surface for carrying the workpiece, and a frame located above the workpiece for holding the foil, the improvement in said membrane press comprising:

(a) a pedestal housing located in said work base and having a cylinder therein communicating through a pedestal opening with the supporting surface of the work base;

(b) a piston rod comprising a workpiece elevating and lowering pedestal positioned in said cylinder in axial alignment therewith and communicating with said supporting surface through said pedestal opening;

(c) upper and lower pistons affixed to said piston rod in fluid-pressure transmitting relation within said cylinder in axially spaced-part relation to each other and defining respective upper and lower axially aligned pressure-transmitting surfaces, said axial alignment of the pressure-transmitting surfaces permitting substantially increased fluid pressure-responsive surface area within the cylinder; and (d) fluid pressure means selectively communicating with said cylinder and said pressure-transmitting surfaces of said pistons for moving said pistons and said pedestal between:
  (i) a workpiece-elevating position wherein one end of said pedestal extends through said pedestal opening to elevate the workpiece above the supporting surface of the work base, and
  (ii) a workpiece-loading position wherein the pedestal is retracted to a position below the workpiece supporting surface of the work base.

13. A membrane press according to claim 12, wherein the cylinder of said pedestal housing comprises axially-aligned, upper and lower divided cylinder portions for housing respective upper and lower pistons.

14. A membrane press according to claim 13, wherein the diameter of the upper piston is slightly smaller than the diameter of the upper cylinder portion.

15. A membrane press according to claim 14, and comprising a fluid sealing ring located around the circumference of the upper piston for restricting the flow of fluid through an annular space between the upper cylinder portion and the upper piston.

16. A membrane press according to claim 13, wherein said upper cylinder portion has a bottom with a centrally disposed circular opening therein having a diameter slightly larger than the diameter of said piston rod, and wherein said piston rod extends through the bottom opening from the upper cylinder portion to the lower cylinder portion.

17. A membrane press according to claim 16, and comprising a fluid sealing ring located at the bottom opening formed in the upper cylinder portion for restricting the flow of fluid into the upper cylinder portion through an annular space between the piston rod and the bottom opening.

18. A membrane press according to claim 13, wherein the diameter of the lower piston is slightly smaller than the diameter of the lower cylinder portion.

19. A membrane press according to claim 18, and comprising a fluid sealing ring located around the circumference of the lower piston for restricting the flow of fluid through an annular space between the lower cylinder portion and the lower piston.

20. A membrane press according to claim 12, and comprising a fluid exhaust path fluidly connected to the cylinder for exhausting fluid contained in the cylinder as said pistons and said pedestal move from the workpiece-loading position to the workpiece-elevating position.

21. A membrane press according to claim 12, wherein said piston rod comprises a hollow section located between said upper and lower pistons and having a longitudinal flow path therethrough from an entrance opening located at a lower end of the hollow section to an exit opening located at an upper end of the hollow section adjacent to a bottom side of the upper piston.

22. A membrane press according to claim 21, wherein the lower end of the hollow section extends outwardly from a bottom side of said lower piston, and selectively communicates with a source of positive air flow for elevating said pistons and said pedestal.

23. A fluid-actuated elevating assembly for elevating a workpiece above a supporting surface of a work base, said elevating assembly comprising:

(a) a pedestal housing having a cylinder therein communicating through a pedestal opening with the supporting surface of the work base;

(b) a piston rod comprising a workpiece elevating and lowering pedestal positioned in said cylinder in axial alignment therewith and adapted for communicating with the supporting surface through said pedestal opening;

(c) upper and lower pistons affixed to said piston rod in fluid-pressure transmitting relation within said cylinder in axially spaced-part relation to each other and defining respective upper and lower axially aligned pressure-transmitting surfaces, said axial alignment of the pressure-transmitting surfaces permitting substantially increased fluid pressure-responsive surface area within the cylinder; and (d) fluid pressure means selectively communicating with said cylinder and said pressure-transmitting surfaces of said pistons for moving said pistons and said pedestal between:
  (i) a workpiece-elevating position wherein one end of said pedestal extends through said pedestal opening to elevate the workpiece above the supporting surface of the work base, and
  (ii) a workpiece-loading position wherein the pedestal is retracted to a position below the workpiece supporting surface of the work base.

* * * * *